(12) United States Patent  (10) Patent No.: US 8,788,527 B1
Nadel et al.  (45) Date of Patent: *Jul. 22, 2014

(54) OBJECT-LEVEL DATABASE PERFORMANCE MANAGEMENT

(75) Inventors: Gil Nadel, Tel Aviv (IL); Kristiaan Kolk, Garderen (NL)

(73) Assignee: Precise Software Solutions, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,745

(22) Filed: Aug. 15, 2011

Related U.S. Application Data

(63) Continuation of application No. 12/475,293, filed on May 29, 2009, now Pat. No. 8,005,860, which is a continuation of application No. 10/750,346, filed on Dec. 31, 2003, now Pat. No. 7,562,094.

(51) Int. Cl.
*G06F 7/00* (2006.01)
*G06F 17/30* (2006.01)

(52) U.S. Cl.
USPC ............................ 707/781; 707/791; 707/802

(58) Field of Classification Search
CPC .................... Y10S 707/99944; Y10S 707/955; G06F 17/30306
USPC ....................................................... 707/781
See application file for complete search history.

(56) References Cited

U.S. PATENT DOCUMENTS

| | | | |
|---|---|---|---|
| 5,450,586 A | 9/1995 | Kuzara et al. |
| 5,471,629 A | 11/1995 | Risch |
| 5,732,218 A | 3/1998 | Bland et al. |
| 5,758,156 A | 5/1998 | Kano |
| 5,881,379 A | 3/1999 | Beier et al. |
| 5,987,480 A | 11/1999 | Donohue et al. |
| 5,996,010 A | 11/1999 | Leong et al. |
| 6,049,827 A | 4/2000 | Sugauchi et al. |
| 6,065,013 A | 5/2000 | Fuh et al. |
| 6,070,190 A | 5/2000 | Reps et al. |
| 6,081,518 A | 6/2000 | Bowman-Amuah |
| 6,094,680 A | 7/2000 | Hokanson |
| 6,144,970 A | 11/2000 | Bonner et al. |
| 6,148,335 A | 11/2000 | Haggard et al. |
| 6,167,448 A | 12/2000 | Hemphill et al. |
| 6,192,377 B1 | 2/2001 | Ganesh et al. |

(Continued)

FOREIGN PATENT DOCUMENTS

WO   WO 2005/008529   1/2005

OTHER PUBLICATIONS

"Mercury Interactive Delivers Web Performance Testing and Monitoring Solutions for Streaming Media," press release, Dec. 12, 2000, 3 pages.

(Continued)

*Primary Examiner* — Binh V Ho

(57) ABSTRACT

A method and system are provided for object-level database monitoring and tuning in a performance management system. Performance data for a plurality of database objects in a database server computer system are collected and stored. A performance problem in the database server computer system is detected. A problematic database object is identified using the performance data for the plurality of database objects, wherein the problematic database object is related to the performance problem. The problematic database object is tuned to improve performance of the database server computer system.

56 Claims, 4 Drawing Sheets

(56) References Cited

U.S. PATENT DOCUMENTS

| | | |
|---|---|---|
| 6,195,097 B1 | 2/2001 | Shrader et al. |
| 6,317,786 B1 | 11/2001 | Yamane et al. |
| 6,317,788 B1 | 11/2001 | Richardson |
| 6,321,263 B1 | 11/2001 | Luzzi et al. |
| 6,351,742 B1 | 2/2002 | Agarwal et al. |
| 6,356,889 B1 | 3/2002 | Lohman et al. |
| 6,389,430 B1 | 5/2002 | Parker |
| 6,400,681 B1 | 6/2002 | Bertin et al. |
| 6,553,369 B1 | 4/2003 | Guay et al. |
| 6,571,233 B2 | 5/2003 | Beavin et al. |
| 6,615,212 B1 | 9/2003 | Dutta et al. |
| 6,697,849 B1 | 2/2004 | Carlson |
| 6,701,363 B1 | 3/2004 | Chiu et al. |
| 6,732,167 B1 | 5/2004 | Swartz et al. |
| 6,757,670 B1 | 6/2004 | Inohara et al. |
| 6,760,903 B1 | 7/2004 | Morshed et al. |
| 6,772,411 B2 | 8/2004 | Hayes et al. |
| 6,792,459 B2 | 9/2004 | Elnozahy et al. |
| 6,792,460 B2 | 9/2004 | Oulu et al. |
| 6,813,248 B1 | 11/2004 | Boss et al. |
| 6,823,382 B2 | 11/2004 | Stone |
| 6,826,606 B2 | 11/2004 | Freeman et al. |
| 6,850,252 B1 | 2/2005 | Hoffberg |
| 6,857,119 B1 | 2/2005 | Desai |
| 6,917,971 B1 | 7/2005 | Klein |
| 6,928,472 B1 | 8/2005 | Wen |
| 6,944,630 B2 | 9/2005 | Vos et al. |
| 6,970,924 B1 | 11/2005 | Chu et al. |
| 6,973,490 B1 | 12/2005 | Robertson et al. |
| 7,107,273 B2 | 9/2006 | Ohata et al. |
| 7,130,807 B1 | 10/2006 | Mikurak |
| 7,143,159 B1 | 11/2006 | Grace et al. |
| 7,146,352 B2 | 12/2006 | Brundage et al. |
| 7,293,133 B1 | 11/2007 | Colgrove et al. |
| 7,382,371 B1 | 6/2008 | Ciabarra |
| 7,546,576 B2 | 6/2009 | Egli |
| 7,606,792 B2 | 10/2009 | Cunningham et al. |
| 7,747,606 B2 * | 6/2010 | Dageville et al. ............. 707/713 |
| 7,849,183 B1 | 12/2010 | Haber et al. |
| 2002/0055964 A1 | 5/2002 | Luk et al. |
| 2002/0083183 A1 | 6/2002 | Pujare et al. |
| 2002/0091746 A1 | 7/2002 | Umberger et al. |
| 2002/0099818 A1 | 7/2002 | Russell et al. |
| 2002/0188592 A1 | 12/2002 | Leonhardt et al. |
| 2003/0007008 A1 | 1/2003 | McBrearty et al. |
| 2003/0055913 A1 | 3/2003 | Harkin et al. |
| 2003/0056200 A1 | 3/2003 | Li et al. |
| 2003/0182276 A1 * | 9/2003 | Bossman et al. ................... 707/3 |
| 2003/0217078 A1 * | 11/2003 | Carlson et al. ................ 707/200 |
| 2003/0220936 A1 | 11/2003 | Gifford |
| 2003/0233445 A1 | 12/2003 | Levy et al. |
| 2003/0236877 A1 * | 12/2003 | Allan ............................ 709/224 |
| 2004/0030782 A1 | 2/2004 | Nakahara |
| 2004/0103079 A1 * | 5/2004 | Tokusho et al. ................... 707/1 |
| 2004/0133591 A1 | 7/2004 | Holenstein et al. |
| 2004/0172636 A1 * | 9/2004 | Do et al. ........................ 719/321 |
| 2004/0205718 A1 * | 10/2004 | Reynders ....................... 717/124 |
| 2004/0215768 A1 | 10/2004 | Oulu et al. |
| 2005/0004892 A1 | 1/2005 | Brundage et al. |
| 2005/0039171 A1 | 2/2005 | Avakian et al. |
| 2005/0050046 A1 | 3/2005 | Puz et al. |
| 2005/0076154 A1 * | 4/2005 | Chambliss et al. ............... 710/1 |
| 2005/0086242 A1 | 4/2005 | Ngai et al. |
| 2005/0091035 A1 | 4/2005 | Kaplan et al. |
| 2005/0091468 A1 | 4/2005 | Morita et al. |
| 2005/0120000 A1 * | 6/2005 | Ziauddin et al. ................... 707/3 |
| 2005/0132335 A1 * | 6/2005 | Maron ......................... 717/127 |
| 2005/0254422 A1 | 11/2005 | Harkin et al. |
| 2006/0010169 A1 | 1/2006 | Kitamura |
| 2006/0115512 A1 | 6/2006 | Peacock et al. |
| 2007/0016556 A1 | 1/2007 | Ann et al. |
| 2007/0271562 A1 | 11/2007 | Schumacher et al. |
| 2007/0288444 A1 | 12/2007 | Nelken et al. |
| 2008/0005317 A1 | 1/2008 | Diao et al. |
| 2008/0134181 A1 * | 6/2008 | Herbeck et al. ............... 718/100 |
| 2008/0229300 A1 | 9/2008 | O'Brien |

OTHER PUBLICATIONS

Akamai. "Turbo-Charging Dynamic Web Sites with Akamai EdgeSuite." Akamai White Paper, 2001, pp. 1-16.

Halfond et al., "Combining static analysis and runtime monitoring to counter SQL injection attacks", ACM, May 2005, pp. 1-7.

Strembeck et al., "An integrated approach to engineer and enforce context constraints in RBAC environments", ACM.\, Aug. 2004, pp. 392-427.

Mueck et al., "A configurable type hierarchy index for OODB", ACM, Mar. 1997, pp. 312-332.

Floreseu et al., The BEA/XQRL streaming Xquery processor, Google Scholar, 29.sup.th VLDB conference 2003, Berlin, Germany, pp. 1-12.

Precise/Indepth for the J2EE Platform User's Guide Version 6.2 Precise 2003 Precise Software Solutions Ltd. All Rights Reserved pp. 1-205.

Stern. "Beyond Client/Server." Advanced Systems, Apr. 1995, all pages, Sunworld.

Symantec. Symantec i3tm for Microsoft.NET. Data Sheet: Application Performance Management, 2006, pp. 1-4, Symantec Corporation.

Veritas. "Veritas Insight 7.1 User's Guide." Aug. 2004, pp. 1.

Veritas. "Veritas Indepth for Microsoft.NET 7.1." User's Guide, 2005, pp. 1.

A brochure by the Applicant (Precise Software Solutions) describing its product Precise/Indepth for Oracle, with an apparent distribution date of 2002.

The user's guide on the product Precise/Indepth for Oracle Version 6.2 provided by the Applicant (Precise Software Solutions), with an apparent distribution date of 2003.

* cited by examiner

OBJECT-LEVEL DATABASE PERFORMANCE MANAGEMENT

BACKGROUND OF THE INVENTION

1. Field of the Invention

This invention is related to the field of application performance management and, more particularly, to the monitoring and tuning of database object performance.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

The database management system (DBMS) is one category of application where performance management can be critical. In previous approaches towards database performance management, queries (e.g., SQL statements) and entire database instances could be monitored and tuned to maintain or improve their performance. It is desirable to provide performance management of additional elements within database management systems.

SUMMARY OF THE INVENTION

Various embodiments of a system and method described herein may provide object-level database monitoring and tuning in a performance management system. In one embodiment, a method of performance management for database server computer systems comprises collecting and storing performance data for a plurality of database objects. The method may further comprise detecting a performance problem in the database server computer system. A problematic database object may be identified using the performance data for the plurality of database objects, wherein the problematic database object is related to the performance problem. The problematic database object may be tuned to improve performance of the database server computer system.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

A performance management system may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAP®; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

Figure 1:
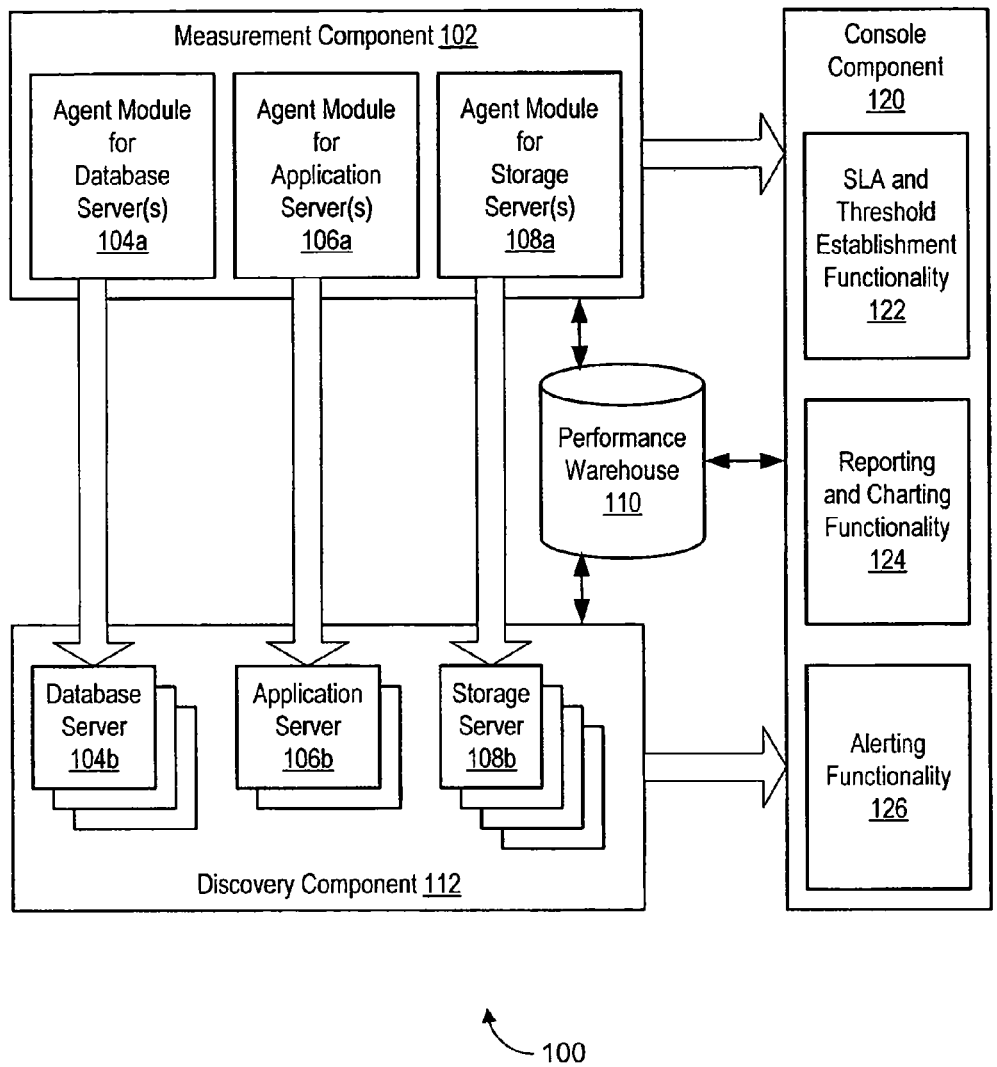
FIG. 1 illustrates an exemplary performance management system in which embodiments of a system and method for performance management may be implemented.
Figure 2:
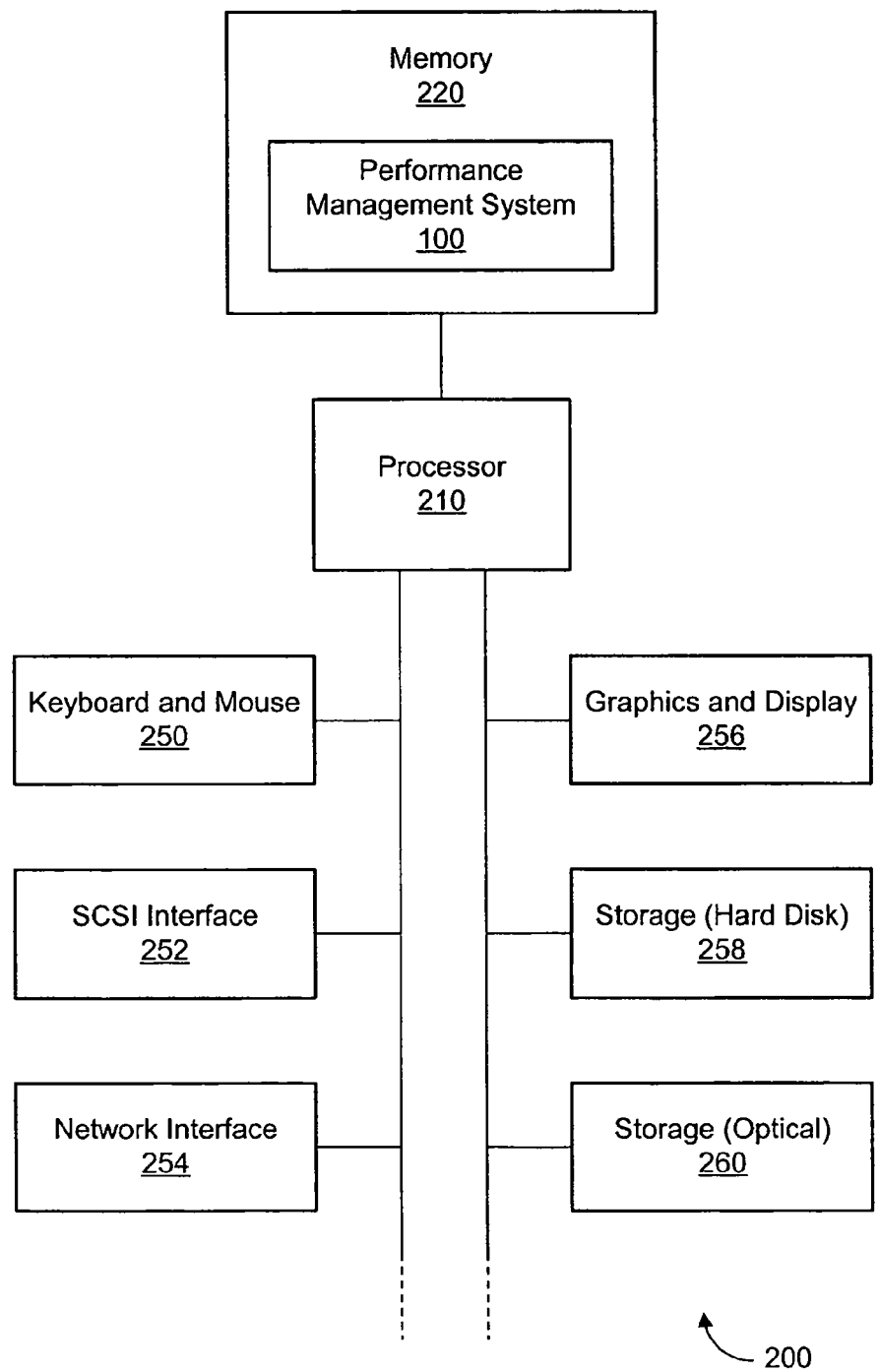
FIG. 2 illustrates components of an exemplary computer system with which embodiments of a system and method for performance management may be implemented.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail.

The performance management system 100 of FIG. 1 may be executed by one or more networked computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. For example, the instructions may include instructions for the performance management system 100. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by a communications bus 207. The network interface 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

Object-level performance management represents a methodology for database application tuning, techniques, and technology that differs from the common practice (e.g., database-level performance management or statement-level performance management). A methodology for object-level performance management is important because of the advancements in modern relational database management systems, where automatic tuning takes place using components such as "SQL Optimizer." Typically, this automatic tuning leaves very little space for application developers to tune applications by modifying SQL statements or for DBAs to tune a database instance by modifying parameters. In effect, modern database management systems leave only one form of decision with the DBA, and that is to define the organization of data inside the application objects. In contrast to existing methodologies, the object-level performance management methodology described herein concentrates on the effect of accessing database objects in queries on the performance of these queries, instead of looking at the amounts of access requests.

Figure 3:
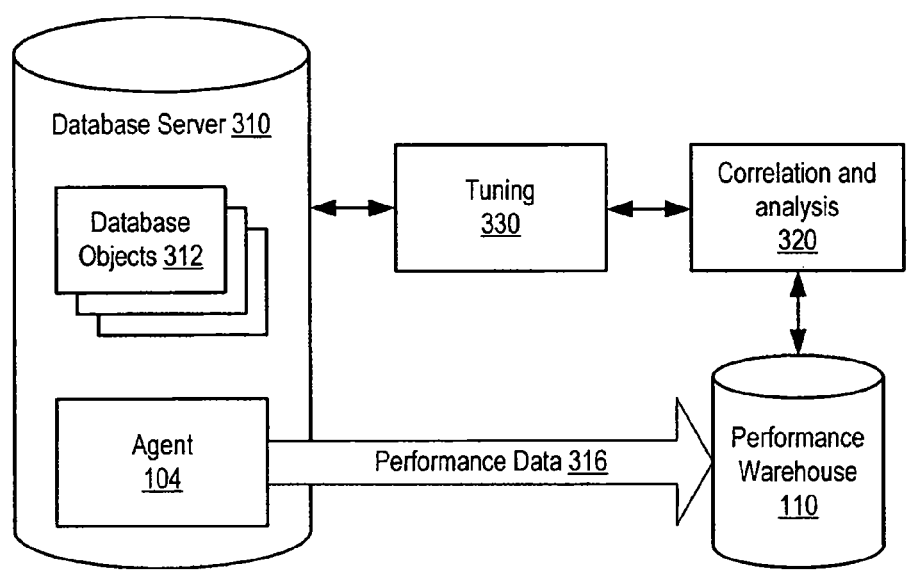
FIG. 3 illustrates components of an object-level database performance management system according to one embodiment.

FIG. 3 illustrates components of a performance management system for database objects according to one embodiment. A database server 310 may provide organized storage and retrieval of large amounts of data. As used herein, the term "database server" is synonymous with "database server computer system" and "database management system." In one embodiment, the database server 310 may comprise a relational database server. In one embodiment, the database server 310 may comprise Oracle® database management software or other suitable database management software. The database server 310 The database server 310 may be implemented using a computer system 200 as illustrated in FIG. 2.

The database server 310 may include one or more database objects 312. Database objects 312 may comprise tables, indices, and other aggregations of data. These objects may participate in the execution of SQL statements, which are the building blocks of database applications. Objects may participate in more than one SQL statement. They may be accessed in parallel by several SQL statements, identical or different. The object might be accessed in various access patterns. All of the above factors may affect the performance of the SQL statements, and hence also the performance of the application.

In one embodiment, the object-level performance management methodology focuses on measuring the time that is needed to access these objects, and how this time affects the performance of the SQL statement itself. The methodology also looks at the participation of objects in SQL statements, the resource required to access the objects, the access patterns, and the resource contention that occurs.

In contrast with other tuning methodologies, the methodology described herein does not consider the amount of access requests as important. For example, it does not matter how many blocks are being read from disk in order to access a certain table, or even how many read operations are being made; what matters is that the SQL statement was waiting for the read operation to finish, and the only important measurement needed is the amount of time the SQL statement waited (i.e., the I/O wait for the object). Likewise, even if no I/O is involved in accessing the table, e.g., because it is buffered in memory, the methodology should consider the time (CPU time) that is needed to traverse the table's blocks in the buffer, not the number of blocks needed.

In one embodiment, the access time measurement, either I/O wait or CPU time, is more important than the amount of I/O operations or blocks visited (logical I/O). The reason is that the size of the object, or even its structure, does not immediately indicate the time needed to perform these actions. As an example, the same table could cause different I/O wait on the SQL statement, depending on whether it is deployed on slow disks or fast disks. More than that, the CPU time required to access a small number of columns of rows in the table is less than the CPU time required to access all columns.

The technology required for following the above methodology is not readily available in any commercially available database management system. However, it can be made available by sampling the activity of the application within the database, and identifying the objects involved in active SQL statements, during every sample.

As discussed with reference to FIG. 1, an agent 104 is operable to monitor the database server 310. In one embodiment, the agent 104 may sample the database objects 312 for various resource consumption cases (e.g., I/O waits, application lock waits, and other types of contention). The agent 104 may collect and store the database-related performance data 316 in the performance warehouse 110. The database-related performance data 316 may be used for correlation with particular database objects 312 and analysis of root causes of performance problems. The correlation and analysis 320 may further be used for tuning 330 of the database server 310, including tuning of specific database objects 312.

Figure 4:
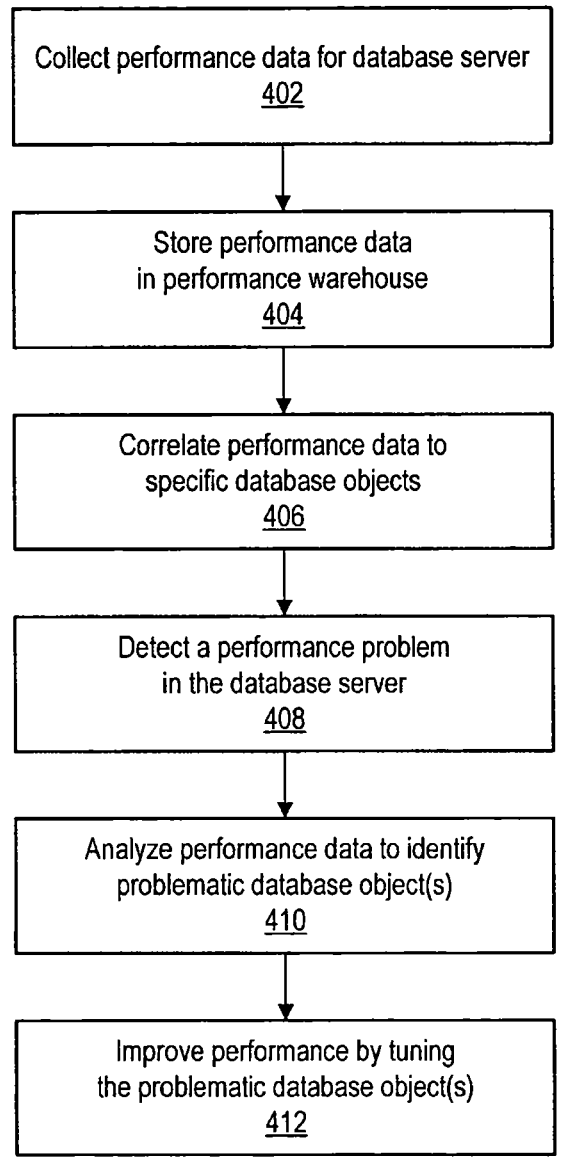
FIG. 4 is a flowchart which illustrates a method of object-level database performance management according to one embodiment.

FIG. 4 is a flowchart which illustrates a method of object-level database performance management according to one embodiment. Performance data 316 for the database server 310 is collected in 402. The performance data 316 may be collected on a routine and automatic basis by the agent 104. The performance data 316 may include occurrences of I/O waits, application lock waits, and other types of contention. In 404 the performance data 316 is stored in a performance warehouse 110.

The performance data 316 is correlated to specific database objects in 406. The correlations may be stored in the performance warehouse 110. As will be described below, various techniques may be used to generate the correlations. Although the examples below are described with reference to Oracle® database servers, similar techniques for other database servers will be apparent to those skilled in the database management arts.

In one embodiment using an Oracle® database server, it is possible to sample which objects are involved in lock contention and other types of contention (e.g., in the v$session dynamic performance view). The column ROW_WAIT_OBJ# holds the information about the object identifier that is currently contended for. By sampling that column for all the sessions in v$session periodically, one can identify which objects appear in contention situations more than others, and one can therefore deduce that these objects have larger contention wait times than others.

In one embodiment using an Oracle® database server (e.g., version 8 or 8i or 9i), it is possible to sample which blocks are involved in I/O operations (e.g., in the v$session wait dynamic performance view). By sampling this table and focusing only on rows that describe I/O events (where the value of the column EVENT is some I/O event, e.g., "db file scattered read"), one can keep a list of relative data block addresses (RDBA) for later analysis. The RDBA is typically kept in the columns P1 and P2 for most I/O events, where P1 is the relative file number and P2 is the block number inside the file. The list of sampled RDBA can be translated to a list of objects by querying the DBA_EXTENTS view for the row, where RELATIVE_FNO is equal to the sampled file number, and the range BLOCK_ID to BLOCK_ID+BLOCKS contains the sampled block number.

In one embodiment using an Oracle® database server (e.g., version 10G), it is possible to sample which objects are involved in I/O operations (e.g., in the v$session dynamic performance view). The column ROW_WAIT_OBJ# holds the information about the object id that is currently involved in an I/O operation. By sampling that column for all the sessions in v$session periodically, one can identify which objects appear in I/O operations more than others, and deduce that these objects have higher I/O wait than others.

The performance warehouse 110 may include an "objects" entity that stores the correlations between particular database objects and performance-related events (e.g., I/O waits, application lock waits, and other types of contention). For example, states such as non-buffered I/O, sequential I/O created during full table scans, random I/O created when scanning indices, and other types of I/O may be shown for a database object. By tracking different I/O states, the performance management system 100 may help the user identify inefficiencies in particular parts of the access path.

In 408 a performance problem in the database server 310 is detected. Performance problems may include undesirable delays and slowness, undesirable usage of resources (e.g., storage), failures to meet user-specified Service Level Agreements (SLAs), and other suitable events. The performance problem may be detected by user analysis of performance reports provided by the performance management system 100. In one embodiment, the monitoring may occur on a routine basis through regular, scheduled analysis of the performance data 316 stored in the performance warehouse 110. Performance problems may also be detected outside of the scheduled analysis, especially in the case of extreme problems that raise alarms through Alerting Functionality 126.

The performance data 316 for the plurality of database objects 312 is analyzed to identify a problematic database object in 410. By analyzing the performance data as correlated to particular database objects, a problematic database object may be detected. The problematic database object may be related to the performance problem and may be a cause of the performance problem.

In one embodiment, automatic identification of the problematic database object may take place. Metrics such as Top Objects involved in I/O Waits and Top Locked Objects may be reported through Alerting Functionality 126. The console component 120 may provide a table of database objects that exceeded performance baselines. The console component 120 may also provide an exception report for database objects. These reports and alerts may identify one or more problematic database objects.

In one embodiment, the user may manually "drill down" through the performance data in the performance warehouse 110 to view performance information at various levels of the database server. For example, a user may be provided a plurality of ways to find and view performance data for a particular database object. From a database server instance, particular files and storage devices, particular statements (e.g., SQL statements), or a program/module/action, a user may drill down to view the lock time and I/O states for particular database object. A lock counter, and various I/O counters may be shown for a particular database object. The owner of the object may also be shown. The user may identify the cause of a performance problem in this manner.

The user may choose to take steps to remedy the performance problem (e.g., to reduce I/O waits on a particular object). In 412 the problematic database object may be tuned to improve performance of the database server 310. In one embodiment, tuning the problematic database object may include moving the problematic database object from non-volatile storage (e.g., a hard drive) to volatile storage (e.g., RAM on the database server computer system) for improved speed of access. In one embodiment, tuning the problematic database object may include creating a new access path to the problematic database object. Creating a new access path may include creating an index, partitioning a table, rebuilding a table, etc. In another embodiment, tuning the problematic database object may including relocating it, entirely or partially, to another storage location in order to balance the I/O wait time among the database objects.

It is further noted that any of the embodiments described above may further include receiving, sending or storing instructions and/or data that implement the operations described above in conjunction with FIGS. 1-4 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, including steps of
   by a measurement component at a server, for one or more database objects, measuring a performance timing effect associated with accessing said database objects;
   identifying a particular database object in response to said performance timing effect, said particular database object adversely effecting performance of said server in correlation with said performance timing effect;
   wherein said steps of identifying include steps of periodically sampling a database performance view, said database performance view being responsive to said performance timing effect; and measuring which particular database objects exhibit said performance timing effect relatively more frequently;
   generating one or more tuning recommendations, wherein the one or more tuning recommendations comprise one or more of: moving said particular database object to a different storage component, or creating a new access path to said particular database object.

2. A method as in claim 1, wherein
   said particular database object includes at least one of:
   a block involved in an I/O operation,
   an object involved in an I/O operation,
   an object involved in lock contention.

3. A method as in claim 1, wherein
   said performance timing effect includes at least one of:
   a measure of CPU time, a time delay, an access time, an application lock wait, an I/O wait, a wait time in response to contention.

4. A method as in claim 1, wherein
   said steps of identifying include steps of
   automatic reporting of said particular database object.

5. A method as in claim 1, wherein
   said steps of identifying include steps of
   correlating said database objects with one or more results of said steps of measuring a performance timing effect.

6. A method as in claim 1, wherein
   said steps of tuning include at least one of:
   transferring said particular database object between a 1st and a 2nd type of memory;
   creating a new access path to said particular database object;
   transferring said particular database object between a 1st and a 2nd location in a memory;
   altering a table at said server.

7. A method as in claim 1, wherein
   said steps of identifying include steps of
   detecting a performance problem associated with accessing said server.

8. A method as in claim 7, wherein
said steps of identifying include steps of
scheduled analysis of one or more results of said steps of measuring a performance timing effect.

9. A method as in claim 1, further comprising tuning said particular database object based on said one or more tuning recommendations.

10. A method as in claim 9, wherein said tuning step is performed automatically.

11. A method as in claim 9, wherein said tuning step comprises tuning a plurality of database objects.

12. A method as in claim 1, further comprising collecting and storing performance data for a plurality of database objects.

13. A method as in claim 1, wherein said one or more tuning recommendations improves a measure of performance of said server.

14. A method as in claim 1, wherein said one or more tuning recommendations improves a measure of performance of an application that accesses said database objects.

15. A method as in claim 1, wherein said performance timing effect comprises access patterns.

16. A method, including steps of
by a measurement component determining an effect of using queries to access one or more database objects on a resource consumption performance of said queries;
identifying a particular database object in response to said steps of determining, said particular database object adversely effecting performance of said server in correlation with said resource consumption performance;
wherein said steps of identifying include steps of
periodically sampling a database performance view, said database performance view being responsive to said resource consumption performance; and
measuring which particular database objects exhibit said resource consumption performance relatively more frequently;
improving a measure of performance of said queries in response to said steps of identifying by one or more of: moving said particular database object to a different storage component, or creating a new access path to said particular database object.

17. A method as in claim 16, wherein
said resource consumption includes a time delay.

18. A method as in claim 16, wherein
said steps of identifying include steps of automatic reporting of said particular database object.

19. A method as in claim 16, wherein
said steps of identifying include steps of
correlating said database objects with one or more results of said steps of determining an effect.

20. A method as in claim 16, wherein
said resource consumption performance includes a time measure.

21. A method as in claim 16, wherein
said steps of improving include steps of tuning said particular database object.

22. A method as in claim 21, wherein
said steps of tuning include at least one of:
moving said particular database object;
creating a new access path to said particular database object.

23. A method as in claim 16, wherein said improving step is performed automatically.

24. A system as in claim 16, wherein said improving step is based on one or more tuning recommendations.

25. A method as in claim 16, wherein said improving step comprises tuning a plurality of database objects.

26. A method as in claim 16, further comprising collecting and storing performance data for a plurality of database objects.

27. A method as in claim 16, wherein said improving step improves a measure of performance of said server.

28. A method as in claim 16, wherein said improving step improves a measure of performance of an application that accesses said database objects.

29. A method as in claim 16, wherein said resource consumption comprises access patterns.

30. A method, including steps of
receiving onto a computer-readable physical medium, sending from a computer-readable physical medium, or storing on a computer-readable physical medium, information interpretable by a computing device, the information including instructions to perform steps of
by a measurement component at a server, for one or more database objects, measuring a performance timing effect associated with accessing said database objects;
identifying a particular database object in response to said performance timing effect, said particular database object adversely effecting performance of said server in correlation with said performance timing effect;
wherein said steps of identifying include steps of
periodically sampling a database performance view, said database performance view being responsive to said performance timing effect; and
measuring which particular database objects exhibit said performance timing effect relatively more frequently;
generating one or more tuning recommendations, wherein the one or more tuning recommendations comprise one or more of: moving said particular database object to a different storage component, or creating a new access path to said particular database object.

31. A method as in claim 30, wherein
said particular database object includes at least one of:
a block involved in an I/O operation,
an object involved in an I/O operation,
an object involved in lock contention.

32. A method as in claim 30, wherein
said performance timing effect includes at least one of:
a measure of CPU time, a time delay, an access time, an application lock wait, an I/O wait, a wait time in response to contention.

33. A method as in claim 30, wherein
said steps of identifying include steps of
automatic reporting of said particular database object.

34. A method as in claim 30, wherein
said steps of identifying include steps of
correlating said database objects with one or more results of said steps of measuring a performance timing effect.

35. A method as in claim 30, wherein
said steps of tuning include at least one of:
creating a new access path to said particular database object;
transferring said particular database object between a 1st and a 2nd location in a memory;
transferring said particular database object between a 1st and a 2nd type of memory;
partitioning or rebuilding a table at said server.

36. A method as in claim 30, wherein
said steps of identifying include steps of
detecting a performance problem associated with accessing said server.

37. A method as in claim 36, wherein
said steps of detecting a performance problem include steps of
scheduled analysis of one or more results of said steps of measuring a performance timing effect.

38. A method as in claim 30, further comprising tuning said particular database object based on said one or more tuning recommendations.

39. A method as in claim 38, wherein said tuning step is performed automatically.

40. A method as in claim 38, wherein said tuning step comprises tuning a plurality of database objects.

41. A method as in claim 30, further comprising collecting and storing performance data for a plurality of database objects.

42. A method as in claim 30, wherein said one or more tuning recommendations improves a measure of performance of said server.

43. A method as in claim 30, wherein said one or more tuning recommendations improves a measure of performance of an application that accesses said database objects.

44. A method as in claim 30, wherein said performance timing effect comprises access patterns.

45. A database server, including
one or more processors;
one or more database objects that participate in the execution of SQL statements, said SQL statements being executed by said one or more processors and said database objects being accessed in response thereto;
a measure of performance of said execution of SQL statements including resource consumption, said measure of performance being responsive to said SQL statements being executed by said one or more processors;
at least one particular said database object adversely affecting said resource consumption; and
agent software operating at said database server,
said agent software identifying said particular database object in response to:
monitoring said database server,
sampling said database objects for resource consumption cases,
maintaining performance data, and
correlating said performance data with said particular database object,
wherein said agent software is operative to tune said particular database object, whereby improving performance of said database server;
wherein said agent software is operative to generate one or more tuning recommendations;
wherein said one or more tuning recommendations comprise one or more of:
moving said particular database object to a different storage component, or creating a new access path to said particular database object.

46. A database server as in claim 45, wherein
said resource consumption cases include at least one of:
a time delay, an access time, an application lock wait, an I/O wait, a wait time in response to contention.

47. A database server as in claim 45, wherein said resource consumption comprises access patterns.

48. A database server as in claim 45, wherein said agent software is operative to tune a plurality of database objects.

49. A database server as in claim 45, wherein said tuning improves performance of an application that accesses said database objects.

50. A system including
one or more processors;
a measurement component including agent software modules capable of identifying particular database objects and capturing performance metrics on said database objects, said
agent software modules being executed by said one or more processors and said performance metrics being updated in response thereto;
wherein said agent software is capable of generating one or more tuning recommendations;
wherein said one or more tuning recommendations comprise one or more of:
moving said particular database object to a different storage component, or creating a new access path to said particular database object;
a discovery component including installations of agent software on each server running target applications, said installations being executed by one or more processors;
a console component communicating key performance indicators to users at appropriate times;
a performance warehouse including a repository of said performance metrics accessible to said measurement component, said discovery component, and said console component.

51. A system as in claim 50, wherein
said performance warehouse includes historical data with respect to said performance metrics.

52. A system as in claim 50, wherein
said console component includes a software element capable of at least one of:
establishing thresholds for said indicators,
reporting and charting said indicators,
providing alerts for said indicators,
managing user interaction with said measurement component and said discovery component.

53. A system as in claim 50, wherein
said servers running target applications include at least one of:
a web server, an application server, a database server, a storage server.

54. A system as in claim 50, wherein said agent software is capable of tuning a plurality of database objects.

55. A system as in claim 50, wherein said agent software is capable of tuning a plurality of database objects based on one or more tuning recommendations.

56. A system as in claim 55, wherein said tuning improves a measure of performance of at least one server accessing said database objects.

* * * * *